US011201817B2

(12) United States Patent
Aranha et al.

(10) Patent No.: US 11,201,817 B2
(45) Date of Patent: Dec. 14, 2021

(54) TRAFFIC STEERING IN FASTPATH (71) Applicant: Cisco Technology, Inc., San Jose, CA (US)

(72) Inventors: Linus Aranha, Los Gatos, CA (US); Murtuza Attarwala, Davis, CA (US)

(73) Assignee: Cisco Technology, Inc., San Jose, CA (US)

( * ) Notice: Subject to any disclaimer, the term of this patent is extended or adjusted under 35 U.S.C. 154(b) by 326 days.

(21) Appl. No.: 15/489,673

(22) Filed: Apr. 17, 2017

(65) Prior Publication Data

US 2018/0302320 A1   Oct. 18, 2018

(51) Int. Cl.
*H04L 12/28* (2006.01)
*H04L 12/725* (2013.01)
*H04L 12/707* (2013.01)
*H04L 12/721* (2013.01)

(52) U.S. Cl.
CPC ............ *H04L 45/302* (2013.01); *H04L 45/22* (2013.01); *H04L 45/123* (2013.01)

(58) Field of Classification Search
CPC .......... H04L 29/0653; H04L 29/06095; H04L 49/3009; H04L 49/309; H04L 45/74; H04L 45/302; H04L 45/22; H04L 45/123
See application file for complete search history.

(56) References Cited

U.S. PATENT DOCUMENTS

| 2006/0182035 | A1* | 8/2006 | Vasseur | H04L 45/24 370/238 |
| 2008/0101367 | A1* | 5/2008 | Weinman | H04L 47/20 370/392 |
| 2014/0213191 | A1* | 7/2014 | Courtice | H04L 45/125 455/67.11 |
| 2014/0269331 | A1* | 9/2014 | Pfeifer | H04L 45/121 370/238 |
| 2016/0112242 | A1* | 4/2016 | Chanukaev | H04L 12/2898 709/226 |
| 2017/0155590 | A1* | 6/2017 | Dillon | H04L 41/5025 |
| 2017/0250906 | A1* | 8/2017 | MeLampy | H04L 45/566 |

* cited by examiner

*Primary Examiner* — Siren Wei
(74) *Attorney, Agent, or Firm* — Polsinelli PC (57) ABSTRACT

A method may include an instruction to route the data to a destination. The method may additionally include inspecting the data to identify metadata associated with the data. The method may further include identifying, based on the metadata, a first routing path and a second routing path that both lead to the destination. The first routing path may include a first communication link associated with a first link classification, and the second routing path may include a second communication link associated with a second link classification. The method may also include selecting the first routing path based on a configuration preference and based on the first routing path including the first communication link associated with the first link classification. The method may additionally include transmitting the data along the first routing path via the first communication link.

16 Claims, 6 Drawing Sheets

TRAFFIC STEERING IN FASTPATH

FIELD

The embodiments discussed in the present disclosure are related to traffic steering in fast path.

BACKGROUND

The use of networks is a useful tool in allowing communication between distinct computing devices. Despite the proliferation of computers and networks over which computers communicate, there still remains various limitations to current network technologies.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include an instruction to route the data to a destination. The method may additionally include inspecting the data to identify metadata associated with the data. The method may further include identifying, based on the metadata, a first routing path that leads to the destination and a second routing path that leads to the destination. The first routing path may include a first communication link associated with a first link classification, and the second routing path may include a second communication link associated with a second link classification. The method may include determining, based on the metadata, a configuration preference for the data to use routing paths with the first link classification. The method may also include selecting the first routing path based on the configuration preference and based on the first routing path including the first communication link associated with the first link classification. The method may additionally include transmitting the data along the first routing path via the first communication link.

One or more embodiments of the present disclosure may additionally include systems and/or non-transitory computer readable media for facilitating the performance of such methods.

The object and advantages of the embodiments will be realized and achieved at least by the elements, features, and combinations particularly pointed out in the claims.

It is to be understood that both the foregoing general description and the following detailed description are merely examples and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments of the present disclosure relate to improvements to the operation of networks, and routing of network traffic. For example, an edge network device (e.g., a router) may include more than one traffic paths through which to route data. For example, in a system with multiple edge devices that may be linked in a manner that provides multiple paths or routes to a destination. Under conventional systems, all of these paths or routes may not be available or even known to the sending edge network device. For example, a routing policy may include a rule to only send the data over a MultiProtocol Label Switching (MPLS) link. In this case, the edge network device may only know of available MPLS links and may not know of other types of links, such as cellular links or Internet links, etc.

Further, when a networking device has multiple paths to a destination, conventional approaches typically use equal cost multipath (ECMP), to reach the destination. Networking devices today may not be able to prefer one or more local path(s) over another, based on the characteristic of the path, such as a path that may better aligns with the need of a particular application.

Aspects of the present disclosure address these and other shortcomings by providing traffic steering in fast path to enhance packet, flow, and application forwarding capabilities of an edge network device. The disclosed edge network device may have the capability to prefer one of multiple local paths (e.g., from the ECMP set) for some or all packets/flow/applications based on a policy. Some embodiments of the present disclosure monitor the various routing paths, and may route data along routing paths with performance superior to a default path. If a preferred path is not present, the edge network device either falls back to doing standard ECMP on the other available paths or drop the traffic.

One or more embodiments of the present disclosure may facilitate the identification of which routing path should be used as a rerouting path.

Embodiments of the present disclosure may provide improvements to computer networks and to the operation of computers themselves. For example, using one or more embodiments of the present disclosure, network traffic may flow with increased performance preserving valuable network resources such as bandwidth and providing increased response times. Additionally, the amount of traffic flowing through the internal network domain may be reduced, providing superior performance for the internal network domain.

Embodiments of the present disclosure are explained with reference to the accompanying drawings.

Figure 1:
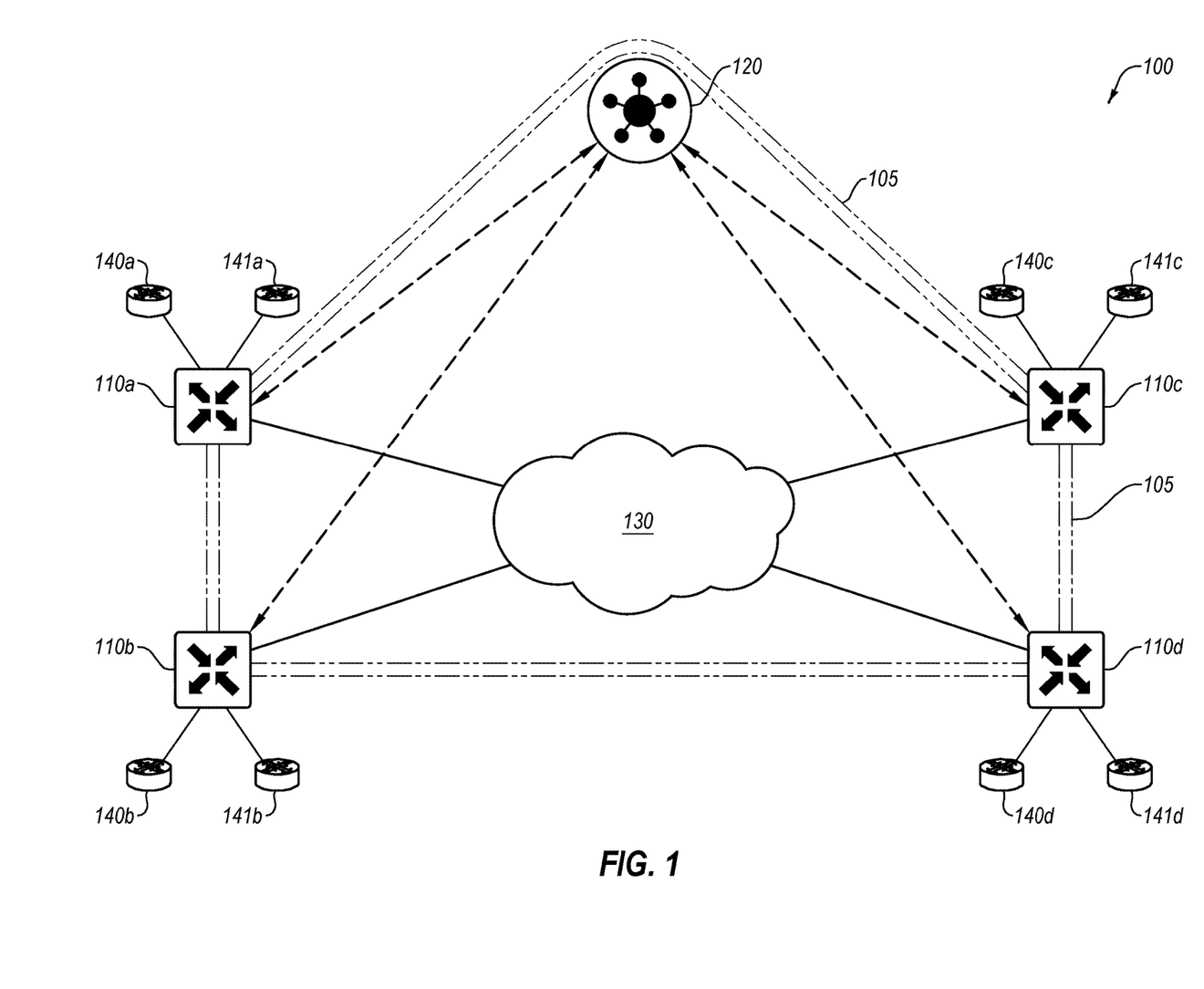
FIG. 1 illustrates an example system of network components implementing a software-defined network (SDN)

FIG. 1 illustrates an example system 100 of network components implementing a software-defined network (SDN), in accordance with one or more embodiments of the present disclosure. The SDN may include any type of network or network topology. For example, the SDN may include a software-defined wide area network (SD-WAN), software-defined local area network (LAN), software-defined metropolitan area network (MAN), or any other type of network. The system 100 may include an internal network domain 105 and one or more external network domains. The system 100 may include one or more edge network devices 110 (such as the edge network devices 110a-110d), a control device 120, a communication network 130, and external network devices 140 and 141 (such as the external network devices 140a-140d and 141a-141d).

For ease and clarity in explanation, some examples of the present disclosure are described with respect to a WAN where the network is managed at least partially by software rather than controlled by hardware. As such, the SDN may support multiple types of connections or communication links, such as the Internet, MultiProtocol Label Switching (MPLS) connections, and/or cellular connections (such as Long Term Evolution (LTE), LTE Advanced, Worldwide Interoperability for Microwave Access (WiMAX), Evolved High Speed Packet Access (HSPA+), and/or others). Additionally, the SDN may support load balancing or load sharing between the various connections. Further, because of the distributed nature of some networks, the SDN may support virtual private networks (VPNs), firewalls, and other security services. In an SD-WAN, for example, a control plane may be functionally separated from the physical topology. In some embodiments, the SDN may separate the control plane of the network (to be managed via software) from a data plane of the network (operating on the hardware of the network). As used herein, the term control plane may refer to communications and connections used in the control and administration of a network itself, rather than the transmission of data through the network, which may occur at the data plane. As used herein, the term data plane may refer to communications and connections used in the transmission and reception of data through the network. For example, the control plane may include administrative traffic directed to a network device within a network, while the data plane may include traffic that passes through network devices within the network.

In some embodiments, the control device 120 may be configured to manage the control plane of an internal network domain 105 by directing one or more aspects of the operation of the edge network devices 110. For example, the control device 120 may generate and/or distribute policies to one or more of the edge network devices 110. A policy may include a rule or set of rules bearing on the handling of network traffic, such as routing, priority, media, etc. The internal network domain 105 may operate as a secured and controlled domain with specific functionality and/or protocols. In some embodiments, the edge network devices 110 may operate based on one or more policies created and/or propagated by the control device 120. In these and other embodiments, the edge network devices 110 may route data traffic within the internal network domain 105 based on the policies created and/or propagated by the control device 120.

In some embodiments, the control device 120 may form a control plane connection with each of the edge network devices 110. The control plane connection may facilitate the exchange of data between the edge network devices 110 and the control device 120 for management and control of the internal network domain 105. The control plane connection may operate via a tunnel through the communication network 130, such as a Datagram Transport Layer Security (DTLS) tunnel. In some embodiments, data transmitted over the control plane connection may facilitate the control device 120 determining topology of the communication network 130. For example, the control device 120 may communicate with the edge network devices 110 to determine what physical connections exist between and among the edge network devices 110 in the communication network 130. Additionally or alternatively, data transmitted over the control plane connection may facilitate the control device 120 determining available, optimal or desired paths across the communication network 130 between and among the edge network devices 110. Additionally or alternatively, data transmitted over the control plane connection may facilitate the edge network devices 110 determining available, optimal or desired paths across the communication network 130 between and among the edge network devices 110. Additionally or alternatively, the control device 120 may communicate route information to the edge network devices 110 over the control plane connection. In these and other embodiments, the control plane connection may include a permanent connection between the control device 120 and the edge network devices 110 such that if the connection between the control device 120 and a given edge network device 110 is broken, the edge network device 110 may be unable or otherwise disallowed from communicating over the internal network domain 105.

In some embodiments, the control device 120 may maintain a central route table that stores route information within the internal network domain 105. For example, the control device 120 may communicate with various edge network devices 110 to determine the physical and/or logical connections available to the edge network devices 110 through the communication network 130. In some embodiments, the edge network devices 110 may include one or more physical and/or logical connections to each other. In these and other embodiments, the control device 120 may generate and/or update one or more policies in conjunction with the central route table to help the edge network devices 110 to determine data traffic routes through the internal network domain 105. For example, the control device 120 may provide policies and other configuration preferences related to traffic flows to the edge network devices 110 rather than being involved with every individual flow through the internal network domain 105.

In these and other embodiments, the edge network devices 110 may not have stored the topology and/or route paths of the entire system 100. Each of the edge network devices 110 may not need to query each other individually to determine reachability. Instead, the control device 120 may provide such information to the edge network devices 110. In these and other embodiments, the edge network devices 110 may route traffic through a most direct route, a most cost effective route, a most reliable route, or through some other route based on one or more other policies received from of the control device 120, characteristics of the traffic, characteristics of the route path, a source edge network device 110, and a destination (e.g., edge network device 110).

In some embodiments, the one or more policies may include guidance regarding determining next-hop and route path instructions. For example, a particular policy may instruct a particular edge network device 110 where to route the traffic next for a particular category, class, or group of traffic flows, rather than providing a complete end-to-end route for the traffic. For example, the edge network device 110a may receive data from an external network device 140a directed to an address of the external network device 141c. The edge network device 110a may have stored a first policy that the network device 110a may use to determine the route path for the data, including that a "next-hop" for network traffic destined for the address of the external network device 141c is to be routed to the edge network device 110d.

In some embodiments, the control device 120 may generate policies to cause certain network traffic flows within the internal network domain 105 to be routed over certain types of connections or communication links (e.g., LTE, Internet, MPLS) and/or through certain edge network devices 110. In some embodiments, a link classification may indicate a type of communication link. The edge network devices 110 may make routing decisions in fast path (e.g., as a packet is travelling through the network). The edge network devices 110 may use a policy to determine an action. For example, for a given set of data, the policy may indicate that a first routing path may be selected based on a configuration preference and based on a type or classification of a communication link. The edge network devices 110 may also determine an action (e.g., determine a route path) for all packets from a particular source, all packets that originated from a particular computer laptop, a type of traffic (e.g., voice), etc. In another example, a policy have a configuration preference that may indicate that all flows with IP addresses in the range 100.1/16 may be categorized as voice flows. When the edge network devices 110 is connected to three different communication links (e.g., an Internet link an MPLS link, a cellular link). The configuration preference may indicate that voice traffic is to be routed over the Internet link. Thus, the edge network devices 110 may route all flows with IP addresses in the range 100.1/16 over the Internet link. Other examples of configuration preferences may include costs (e.g., monetary, time, route, hops, transport health (such as loss, latency, and/or jitter), bandwidth, path geography, source (e.g., device, geography, user), destination (e.g., device, geography, user), applications (e.g., business, social), user groups (e.g., finance on a first subnet IP, HR on a second subnet IP, engineering on a third subnet IP, among others. Any type of data or information may be used as a configuration preference. In an example, the edge network device 110 may identify metadata associated with the traffic, such as a header. The header may include a DSCP value in the header to indicate a predefined routing path. The edge network device 110 may also make routing decisions based on a specific application (which may sometimes be referred to as a layer7 header or http header). For example, the edge network device 110 may route OFFICE365 traffic on a first path and SALESFORCE traffic on a second path.

In some embodiments, the control device 120 may receive one or more keys from the edge network devices 110 used in communication of data over the data plane. For example, one or more data packets may use one or more keys for security purposes in transmitting data from one edge network device 110 to another edge network device 110. In these and other embodiments, the control device 120 may reflect the received keys to one or more other edge network devices 110 that may be in the traffic flow based on the central route table and/or the policies implemented by the control device 120. In these and other embodiments, a given edge network device 110 may generate symmetrical keys to facilitate secure communication between edge network devices. In these and other embodiments, a pair of symmetrical keys may be generated by the given edge network device 110, with one remaining with the given edge network device 110 and the other provided to the control device 120 such that the control device 120 may distribute the other symmetrical key to other edge network devices that communicate with the given edge network device 110. In such a way, each edge network device that is to communicate with the given edge network device 110 based on the policies of the control device 120 may receive the symmetrical key.

In some embodiments, traffic within the internal network domain 105 may be encrypted, such as with two-way authentication using Advanced Encryption Standard (AES) with a 256-bit length key over one or more Datagram Transport Layer Security (DTLS) and/or Transport Layer Security (TLS) connections between edge network devices 110.

In some embodiments, the control device 120 may store authentication information for one or more (or all) of the edge network devices 110 within the internal network domain 105. In these and other embodiments, a device may be prevented from communicating within the internal network domain 105 unless the device has authentication information that matches or otherwise corresponds to the stored authentication information of the control device 120. In some embodiments, the authentication information may be used when the edge network devices 110 first come on line to establish the control plane connection, and any device without a control plane connection with the control device 120 may be prevented from communicating within the internal network domain 105.

The edge network devices 110 may operate at a boundary of the internal network domain 105. The edge network devices 110 may include one or more physical and/or logical connections that may operate within the internal network domain 105. Such connections may be illustrated as part of the communication network 130. Additionally or alternatively, the edge network devices 110 may include one or more physical and/or logical connections operating outside of the internal network domain 105. For example, the edge network devices 110 may be connected to the external network device(s) 140 and/or 141.

In some embodiments, the edge network devices 110 may operate to route traffic from associated external network devices 140 and 141 into the internal network domain 105. Additionally or alternatively, the edge network devices 110 may operate to route traffic from the internal network domain 105 to the associated external network devices 140 and 141. In some embodiments, the edge network devices 110 may communicate with associated external network devices 140 and 141 using typical communication protocols, such as Open Shortest Path First (OSPF), Border Gateway Protocol (BGP), Virtual Router Redundancy Protocol (VRRP), Bi-directional Forwarding Detection (BFD), among others. Additionally or alternatively, the edge network devices 110 may support other network functionalities such as differentiated services code point (DSCP) tagging or type of service (TOS) tagging, Quality of Service (QoS) monitoring, Service Level Agreements (SLA), Internet Protocol (IP) forwarding, Internet Protocol Security (IPsec), Access Control Lists (ACL), among others.

For example, with DSCP or TOS tagging, the edge network devices 110 may be configured to insert a DSCP or TOS tag into a packet header. Such a DSCP or TOS tag may identify one (or a preferences for one) communication link of multiple communication links on which to send certain types of network traffic. Based on the DSCP or TOS tag, the edge network devices 110 may route the network traffic via one or more types of communication link.

As another example, with QoS monitoring of communication links, the edge network devices 110 may provide for one or more QoS metrics that may be monitored for any communication link, such as jitter, bandwidth, error rate, bit rate, throughput, and/or others.

As an additional example, with SLAs, the edge network devices 110 may include an agreed upon threshold level for one or more QoS metrics, such as bandwidth, availability, jitter, and/or others. In these and other embodiments, a given edge network device 110 may be configured to adjust or otherwise modify one or more properties of how the given edge network device 110 handles or routes traffic to better comply with one or more SLAs. For example, the traffic flow for one application may be sent via a particular communication link so that the traffic flow may comply with a corresponding SLA.

As another example, with IP forwarding, the edge network devices 110 may include one or more policies to route packets via a particular type of communication link in an IP network. For example, such a policy may take into account factors such as packet size, services specified by a header, characteristics of potential links to other routers in the network, and/or others. Using such factors, the edge network devices 110 may forward packets based on a selected algorithm, such as a shortest path.

As an additional example, with IPsec, the edge network devices 110 may use IPsec to authenticate and/or encrypt network traffic. For example, a given edge network device 110 may authenticate one or more computing devices to communicate with the given edge network device 110 and/or encrypt one or more packets communicated between the computing device and the given edge network device 110.

As another example, with ACLs, the edge network devices 110 may include a set of rules indicative of one or more addresses, hosts, and/or networks that may be permitted to use a given port or a particular communication link. In these and other embodiments, the edge network devices 110 may include ACLs that are applicable to inbound traffic, outbound traffic, or both.

In some embodiments, the edge network devices 110 may locally maintain one or more route tables. In some embodiments, the edge network devices 110 may adjust or modify the route tables based on one or more policies sent from the control device 120. For example, one or more entries may be removed, discarded, or otherwise not added to the route tables by the edge network devices 110 based on the one or more policies. In some embodiments, the edge network devices 110 may include logic to update, modify, and/or generate the route tables based on policies from the control device 120 and/or from traffic handled by the edge network devices 110. The one or more route tables may be automatically populated by the edge network devices 110 based on direct interface routes, static routes, and/or dynamic routes learned using one or more network protocols such as BGP and/or OSPF. In some embodiments, routing decisions for data outside of the internal network domain 105 may be performed by a particular edge network device 110 without specific direction, input, or control from the control device 120. For example, the particular edge network device 110 may compute a routing decision based on the one or more policies that the particular edge network device 110 has received from the control device 120.

In some embodiments, one or more of the edge network devices 110 and/or the control device 120 may be implemented as one or more virtual machines operating on one or more physical computing devices. Additionally or alternatively, the edge network devices 110 and/or the control device 120 may each include an individual stand-alone computing device.

Modifications, additions, or omissions may be made to FIG. 1 without departing from the scope of the present disclosure. For example, while illustrated as including four edge network devices 110 and one control device 120, the system 100 may include any number of edge network devices 110 and control devices 120, such as thousands or tens of thousands of edge network devices 110 and more than five control devices 120. As another example, as illustrated as a single communication network 130, the communication network 130 may include multiple types of communication connections.

Figure 2:
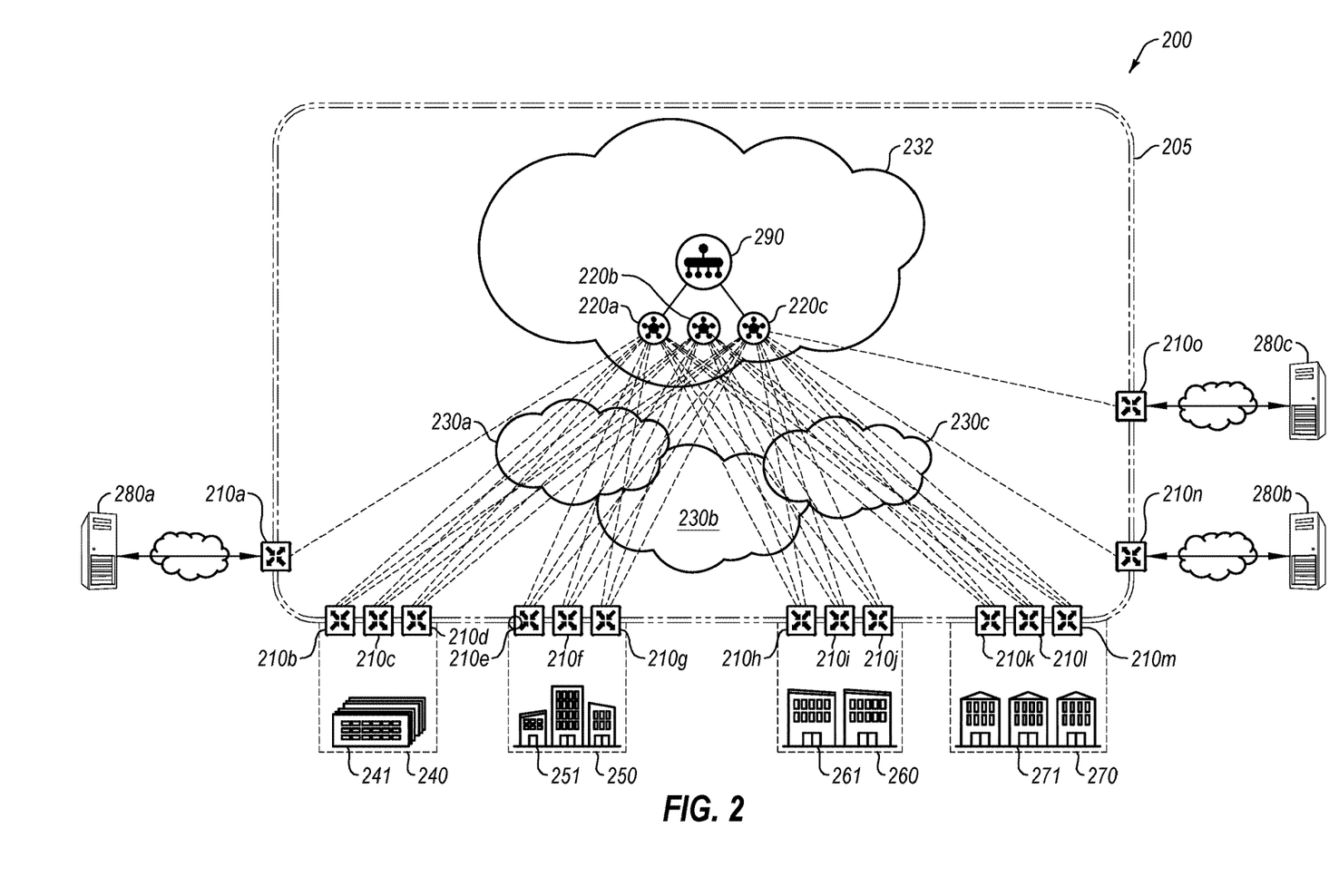
FIG. 2 illustrates another example system implementing a SDN.

FIG. 2 illustrates another example system 200 of network components implementing a SDN, in accordance with one or more embodiments of the present disclosure. The system 200 may include one or more edge network devices 210 (such as edge network devices 210a-210o), one or more control devices 220 (such as control devices 220a, 220b, and 220c), and one or more communication networks 230 (such as communication networks 230a, 230b, and 230c). The edge network devices 210 may be similar or comparable to the edge network devices 110 of FIG. 1, the control devices 220 may be similar or comparable to the control device 120 of FIG. 1, and the communication networks 230 may be similar or comparable to the communication network 130 of FIG. 1. The system 200 may be a similar or comparable system to the system 100 of FIG. 1, although expanded to include additional network components and additional external network domains.

The system 200 may include an internal network domain 205 in and between the edge network devices 210, in a similar or comparable manner to that described with respect to the system 100 of FIG. 1. The system 200 additionally may include multiple external network domains. For example, a data center 240 may represent a first external network domain, a campus 250 may represent a second external network domain, a branch 260 may represent a third external network domain, and a remote site 270 may represent a fourth external network domain. In these and other embodiments, each external network domain may include one or more edge network devices 210 acting as a bridge between the internal network domain 205 and the given external network domain. Additionally or alternatively, one or more of the external network domains may functionally operate as being accessible from the other external network domains as though in a single network by being communicatively coupled through the internal network domain 205.

In some embodiments, the system 200 may include one or more external resources 280 (such as the external resources 280a-280c). The external resources 280 may be operated by the same entity or organization that operates the internal network domain 205, or may be operated by a different entity. In these and other embodiments, the system 200 may include an edge network device 210 that may be associated with a particular external resource 280. For example, the system 200 may include an edge network device 210 located within a regional co-location facility. A regional co-location facility may include a location with directed or guaranteed access to the Internet or other communication protocols at a given physical location. In some embodiments, a regional co-location facility may include a prioritized or improved connection to one or more of the external resources 280. In some embodiments, the regional co-location facility may be at a designated geographical location that may be physically proximate one or more of the external network domains. For example, the data center 240 may be located in New York, and the branch 260 may be located in Dallas Tex., and the edge network device 210n may be in a regional co-location facility in Houston, Tex.

The external resources 280 may include any computing service available for consumption by the system 200. For example, the external resources 280 may include a cloud-based service such as a software subscription or software as a service (SaaS) (such as Microsoft Office 365®, Azure®, Google Apps®, Workforce®, Amazon Web Services®, WorkDay®, DocuSign®, GoToMeeting®, WebEx®, Quick- Books®, and/or others), media services (such as YouTube®, NetFlix®, Pandora®, Spotify®, and/or others), and/or others). In these and other embodiments, the external resources 280 may include a third party network to facilitate access to the external resource 280 with one or more access points at various geographical locations. For example, a SaaS may include an access server in Austin, Tex.; Palo Alto, Calif.; and New York, N.Y. for accessing the third party network.

In some embodiments, the system 200 may be geographically distributed. For example, the data center 240 may be located in St. Paul, Minn.; the campus 250 may be located in Des Moines, Iowa; there may be branches 260 in Seattle, Wash.; Los Angeles, Calif.; Atlanta, Ga.; and Orlando, Fla.; and there may be remote sites 270 in London, England; Berlin, Germany; and Seoul, Korea. In these and other embodiments, the system 200 may use the communication networks 230 and the internal network domain 205 to facilitate communication between all of these distributed physical locations as a single network.

In some embodiments, one or more of the external network domains may use one or more applications with resources in the data center 240, such as Microsoft Exchange®, SharePoint®, Oracle e-Business Suite®, and/or others. For example, a workstation operating at the campus 250 may operate Microsoft Exchange®. The operation of the application may include a data flow that goes from the workstation to the edge network device 210e in the external network domain of the campus 250. The data flow may go from the edge network device 210e to one of the edge network devices 210b, 210c, and/or 210d associated with the data center 240 through the internal network domain 205. The one of the edge network devices 210b, 210c, and/or 210d may route the traffic to the Microsoft Exchange® server in the external network domain of the data center 240. Additionally or alternatively, the operation of the application may include a data flow in the reverse order of data flowing from the Microsoft Exchange® server to the workstation.

In some embodiments, the system 200 may include a network management device 290 that may communicate with the control devices 220 over a management network 232. The network management device 290 may provide management and control of one or more devices associated with the internal network domain 205, including the edge network devices 210, the control devices 220, and/or others. For example, the network management device 290 may provide a graphical user interface (GUI) that provides a network administrator with access to control or observe operation of the internal network domain 205. In some embodiments, the network administrator may input policies via the network management device 290 that may be communicated to the control devices 220 for implementation via the edge network devices 210. In some embodiments, the network management device 290 may provide a GUI dashboard with a visual and/or textual description of one or more properties of the internal network domain 205, such as a number and/or status and/or health of edge network devices 210, a number and/or status of control devices 220, a number of and/or last time of reboot, transport health (such as loss, latency, and/or jitter), a number of sites that are operating or not operating, application consumption of network resources, application routing, and/or others.

In some embodiments, the network management device 290 may be configured to recognize approved edge network devices 210 and/or control device 220. For example, the network management device 290 may maintain a list of serial numbers, MAC addresses, or other uniquely identifying information for the edge network devices 210 and/or the control devices 220. In these and other embodiments, communication in the internal network domain 205 may be restricted to edge network devices 210 and/or control devices 220 with identifying information on the list maintained by the network management device 290.

In some embodiments, the network management device 290 may be configured to generate and/or store configurations of one or more edge network devices 210 and/or control devices 220. For example, a network administrator may use the network management device 290 to configure a particular edge network device 210 and may store that configuration as a template that may be applied to future edge network devices. Additionally or alternatively, a template for the edge network devices 210 may be provided by a third party and applied to a new edge network device 210. In these and other embodiments, a template for the control devices 220 may be generated, stored, and/or applied to a new control device 220. Additionally or alternatively, such a template may be used to automatically configure a newly deployed edge network device 210. For example, the newly deployed edge network device 210 may be brought online and connected to a corresponding control device 220. The corresponding control device 220 may verify the serial number of the edge network device 210 with the network management device 290, and may obtain a template from the network management device 290 for the edge network device 210. The control device 220 may send the template to the edge network device 210 to be automatically installed to configure the edge network device 210 according to the template.

In some embodiments, the network management device 290 may be implemented as a physical device or a virtualized machine. In these and other embodiments, the network management device 290 may be physically located proximate a centralized location, such as within the data center 240 or at the campus 250.

Modifications, additions, or omissions may be made to FIG. 2 without departing from the scope of the present disclosure. For example, while illustrated as including a certain number of edge network devices 210 and external network domains, the system 200 may include any number of edge network devices 210 and external network domains.

Figure 3:
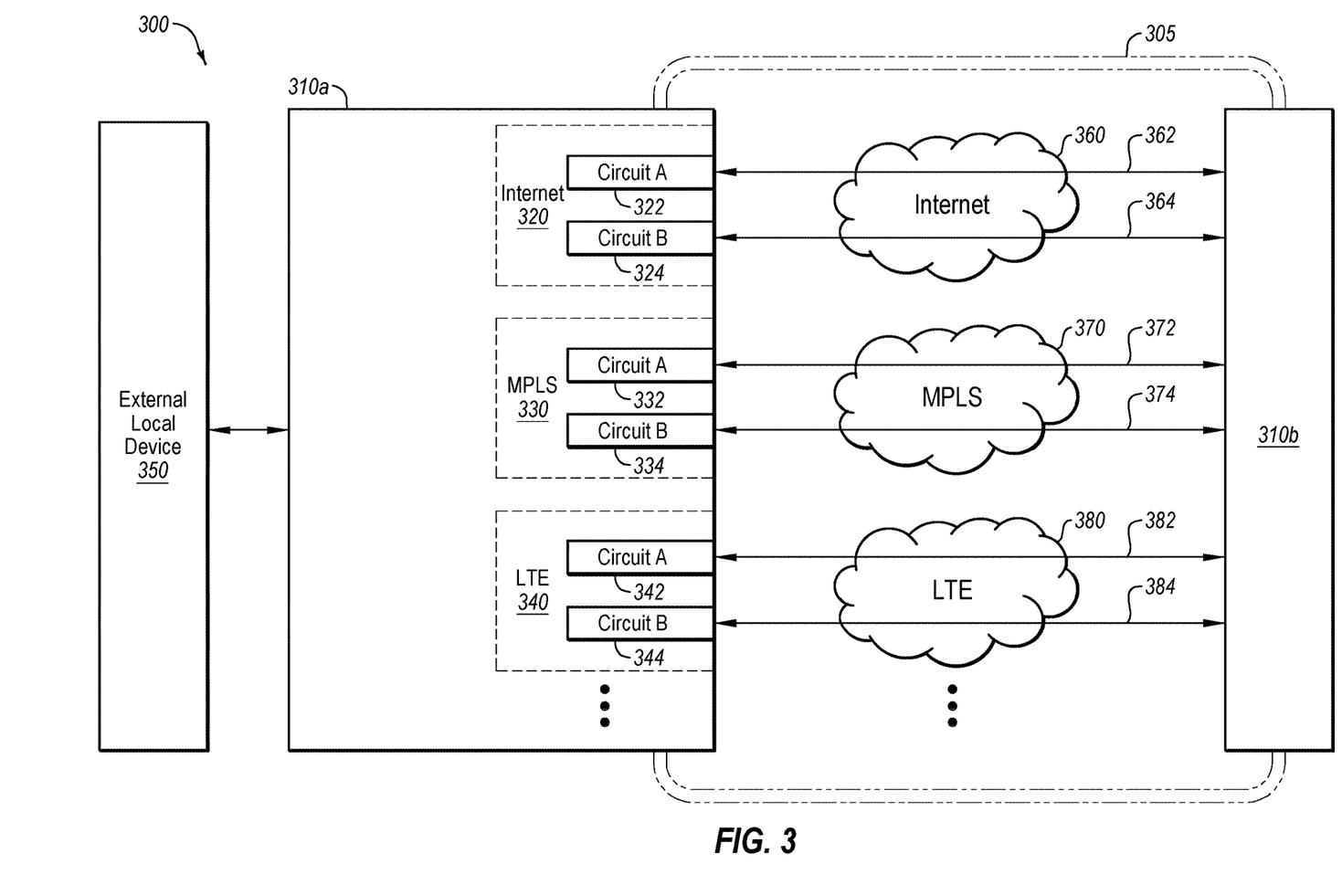
FIG. 3 illustrates an additional example system as part of a SDN.

FIG. 3 illustrates an additional example system 300, in accordance with one or more embodiments of the present disclosure. FIG. 3 illustrates an edge network device 310a that may include multiple potential communication links for communicating across an internal network domain 305 to another edge network device 310b. For example, the edge network device 310a may communicate across the internal network domain 305 using the Internet 360, an MPLS network 370, and/or an LTE network 380. The edge network devices 310a and 310b may be similar or comparable to the edge network device 110 of FIG. 1 and/or the edge network devices 210a-210o of FIG. 2. The system 300 may additionally include an external local device 350 that may be communicatively coupled to the edge network device 310a across an external network domain.

In some embodiments, the edge network device 310a may include an Internet connection 320, an MPLS connection 330, and an LTE connection 340. As illustrated by the ellipses below the LTE connection 340, any number of additional or other potential connections may also be included. In these and other embodiments, the edge network device 310a may include multiple circuits for connecting to the one or more potential communication links. For example, the edge network device 310a may include a circuit A 322 and a circuit B 324 for the Internet connection 320, a circuit A 332 and a circuit B 334 for the MPLS connection 330, and a circuit A 342 and a circuit B 344 for the LTE connection 340. In these and other embodiments, the edge network device 310a may be configured to route traffic along one or more of the circuits, based on one or more policies stored by the edge network device 310a.

In some embodiments, the edge network device 310a may be configured to monitor one or more properties of the various connections. For example, the edge network device 310a may monitor the jitter, latency, loss, and/or bandwidth of the various communication links from the edge network device 310a to the edge network device 310b. In these and other embodiments, the edge network device 310a may also monitor and/or store security properties of the various communication links. For example, links 362 and 364 over the Internet 360 may be considered at a first level of security, and links 372 and 374 over the MPLS network 370 may be considered at a second level of security higher than the first level of security.

In some embodiments, the edge network device 310a may route traffic for one or more applications to specific circuits based on one or more policies and/or based on one or more properties of the various connections. For example, a video application may be particularly susceptible to jitter. The edge network device 310a may determine that the video traffic may be travelling across the link 382 with a jitter of 10 ms, and that the link 362 may have a jitter of 4 ms. The edge network device 310a may shift the traffic for the video application to the link 362 rather than the link 382 because of the lower jitter. In some embodiments, shifting from the link 382 to the link 362 may be based on a jitter-based SLA. As another example, the edge network device 310a may receive a data flow for a security-sensitive application (such as an accounting application) and may have a policy that data for that application is to be routed along one of the MPLS links 372 and/or 374, even if other traffic may be routed along the Internet link 362. As an additional example, the edge network device 310a may include an SLA that a given application have a bandwidth of 10 MB/s available to the application. The edge network device 310a may make the link 362 over the Internet 360 available to the application, but the link 362 may provide 5 MB/s of bandwidth. The edge network device 310a may also provide the links 382 and 384 to the application such that the overall combined bandwidth of the links 362, 382, and 384 exceed the bandwidth agreement of the SLA. As yet another example, the edge network device 310a may route traffic for a given application via a particular type of communication link. In at least one embodiment, the edge network device 310a may prohibit traffic for a given application along a particular type of communication link. For example, traffic associated with a social network or video application may be routed over the Internet connections 362, 364 and prohibited from being routing over MPLS connections 372, 374. In these and other embodiments, the edge network device 310a may be configured to perform such routing based on initially receiving a data flow, during an on-going data flow (e.g., in fast path), based on a triggering event of the data flow, and/or others or combinations thereof. Additionally or alternatively, such routing may combine multiple links of multiple types of connections for a single flow in routing traffic flows.

In some embodiments, the edge network device 310a may be configured to route traffic to the various links based on the source of the traffic. For example, one or more policies may indicate that traffic from one corporate department of a business is routed along the MPLS connection 330, while traffic for another corporate department may be routed along any link.

Figure 6:
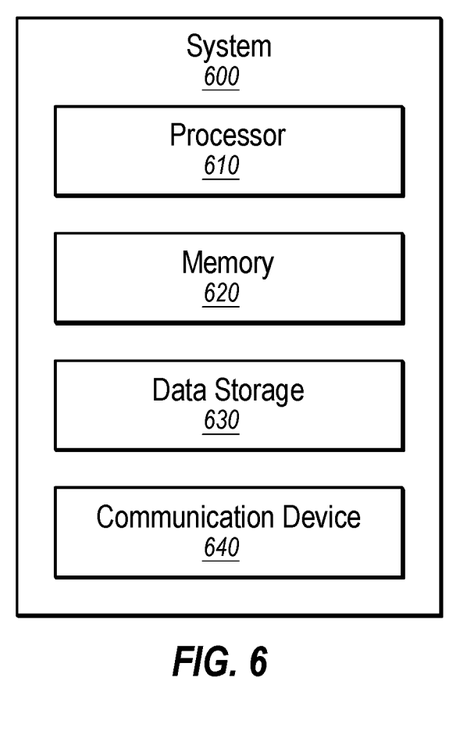
FIG. 6 illustrates an example computing system.

In some embodiments, the edge network device 310a may be implemented as a computing system, such as the computing system 600 illustrated in FIG. 6.

Modifications, additions, or omissions may be made to FIG. 3 without departing from the scope of the present disclosure. For example, while illustrated as including a certain number of edge network devices 310, the system 300 may include any number of edge network devices 310. As another example, while illustrated as including three communication networks (the Internet 360, the MPLS-based network 370, and the LTE network 380) any number of communication networks may be used.

Figure 4:
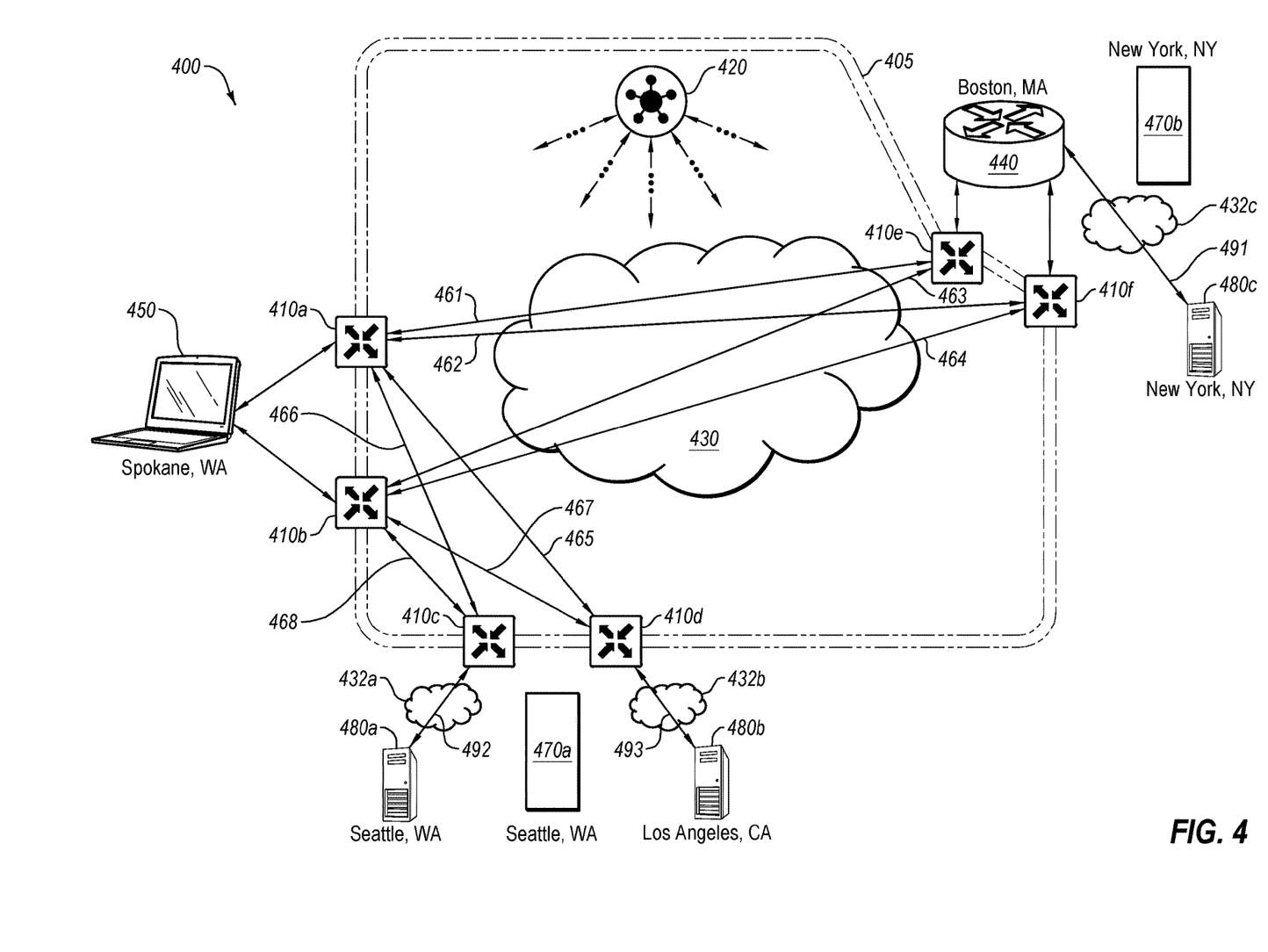
FIG. 4 illustrates another example system implementing a SDN.

FIG. 4 illustrates another example system 400 implementing a SDN, in accordance with one or more embodiments of the present disclosure. The system 400 may include one or more edge network devices 410 (such as the edge network devices 410a-410f), which may be similar or comparable to the edge network devices 110 of FIG. 1, 210 of FIG. 2, and/or 310 of FIG. 3. The system 400 may also include one or more control devices 420, which may be similar or comparable to the control device 120 of FIG. 1, and/or 220 of FIG. 2. The system 400 may additionally include one or more communication networks 430 and/or 432 (such as the communication networks 432a-432c), which may be similar or comparable to the communication network 130 of FIG. 1, 230 of FIG. 2, and/or the combination of any of the Internet 360, the MPLS network 370, and the LTE network 380 of FIG. 3. The system may additionally include a data center 440, which may be similar or comparable to the data center 240 of FIG. 2. The system may also include one or more third party resources 480 (such as the third party resources 480a-480c), which may be similar or comparable to the third party resources 280a-c of FIG. 2. For the purposes of discussing FIG. 4, the third party resources 480a-480c may serve the same third party resource and may represent distinct servers for accessing the third party resource. For example, the third party resource 480a may include a server for accessing a cloud based service in Seattle, Wash., the third party resource 480b may include a server for accessing the cloud based service in Los Angeles, Calif., and the third party resource 480c may include a server for accessing the cloud based service in New York, N.Y.

In some embodiments, the edge network device 410a may determine which path a traffic flow may take. For example, the edge network device 410a may identify metadata associated with the traffic flow and determine, based on the metadata, a configuration preference for the data to use routing paths with a first link classification. The edge network device 410a may select a first routing path based on the configuration preference and based on the first routing path including the first communication link associated with the first link classification. The edge network device 410a may transmit the data along the first routing path via the first communication link. In at least one embodiment, there may be multiple paths to a particular destination via different edge network device connections to the same underlying transport (e.g., Internet or MPLS). Alternatively or additionally, there may be multiple paths via the same two sets of edge network devices connected via different underlying transport. For example a first underlying transport may include Internet and a second underlying transport may include MPLS.

In some embodiments, each of the edge network devices 410 may assess the performance of paths between a given edge network device 410 and the other edge network devices 410. For example, the edge network device 410a may monitor the performance of the paths 461, 462, 465, and 466; and the edge network device 410b may monitor the performance of the paths 463, 464, 467, and 468. In these and other embodiments, the edge network devices 410 may monitor one or more of jitter, latency, loss, and/or bandwidth of the various paths. For example, one or more test packets may be communicated among or between the edge network devices 410 and characteristics of the travel time and/or integrity of the test packets may be used to determine the performance metrics of the paths. Additionally or alternatively, one or more of the performance metrics may be combined into a single score reflecting the performance of the paths within the internal network domain 405.

In some embodiments, one or more of the edge network devices 410 may communicate the determined performance metrics with one or more components of the system 400. For example, the edge network devices 410 may communicate the performance metrics to the control device 420, and the control device 420 may distribute the performance metrics to one or more of the edge network devices 410. As another example, the edge network devices 410 may communicate the performance metrics to one or more other edge network devices 410 (e.g., the edge network device 410b may communicate the performance metrics for the paths 463, 464, 467, and 468 to the edge network device 410a).

In some embodiments, one or more of the edge network devices 410 may assess the performance of paths between a given edge network device 410 and one or more connections to the third party resource 480. For example, the edge network devices 410e and/or 410f may monitor the performance of the path 491, the edge network device 410c may monitor the performance of the path 492, and the edge network device 410d may monitor the performance of the path 493. In these and other embodiments, the edge network devices 410 may monitor one or more of jitter, latency, loss, and/or bandwidth of the various paths. For example, one or more requests may be communicated from the edge network devices 410 to the third party resource 480 and characteristics of the travel time and/or integrity of the response to the request may be used to determine the performance metrics of the paths. For example, the edge network devices 410 may use httping, or some other similar tool. In some embodiments, one or more of the performance metrics may be combined into a single score reflecting the performance of the path outside of the internal network domain 405.

In some embodiments, the edge network devices 410 may maintain a table, database, or other storage structure of the scores of the performance metrics of the various paths in the system 400. In these and other embodiments, the edge network devices 410 may use the stored scores when determining routing paths for data. For example, the edge network device 410a may store a table with a single score for each of the paths in the system 400.

In some embodiments, the edge network device 410a may compare scores of the potential paths to the third party resource 480 to determine which path the rerouted traffic may flow along. For example, the edge network device 410a may compare the combined scores of the paths 461+491, 462+491, 465+493, 466+492, 467+493, and 468+492. In these and other embodiments, the edge network device 410 may determine which score represents the best performance for the traffic.

In some embodiments, the internal network domain 405 may include multiple possible paths between two edge network devices 410. For example, the path 465 between the edge network device 410a and the edge network device 410d may represent an MPLS connection, and a second connection (not illustrated) between the edge network device 410a and the edge network device 410d may include an Internet or cellular connection. In these and other embodiments, each path, including multiple paths between the same two edge network devices 410, may each include a unique score. Using such unique scores, the edge network device 410 may determine which path to be used.

In some embodiments, if multiple paths have the same score representing the best score for routing data, the edge network device 410a may route the traffic along the multiple paths with the best score. For example, a first set of the data may be routed along the first path and a second set of the data may be routed along a second path with the same score as the first path. In determining whether to route along the first path or the second path, the edge network device 410a may hash the header of a packet within the flow and, depending on the output of the hash, may route the flow to one of the first path or the second path. While described as the path or paths with the best score, the path with a score relative to a threshold may also be selected.

In some embodiments, the edge network device 410a may designate a primary path and a backup path for the rerouted path. The edge network device 410a may monitor the performance of the primary path of the rerouted path and, based on changes in the score for the primary path, the edge network device 410a may reroute the traffic to the backup path or a different path. In some embodiments, the score may be monitored and/or rerouted relative to an SLA. In at least one embodiment, the primary path may be determined based on the configuration preference.

Modifications, additions, or omissions may be made to FIG. 4 without departing from the scope of the present disclosure. For example, while illustrated as including a certain number of edge network devices 410, the system 400 may include any number of edge network devices 410. As another example, while illustrated as including a single path between any two edge network devices 410, any number of paths over any number of mediums may be included between edge network devices 410.

Figure 5:
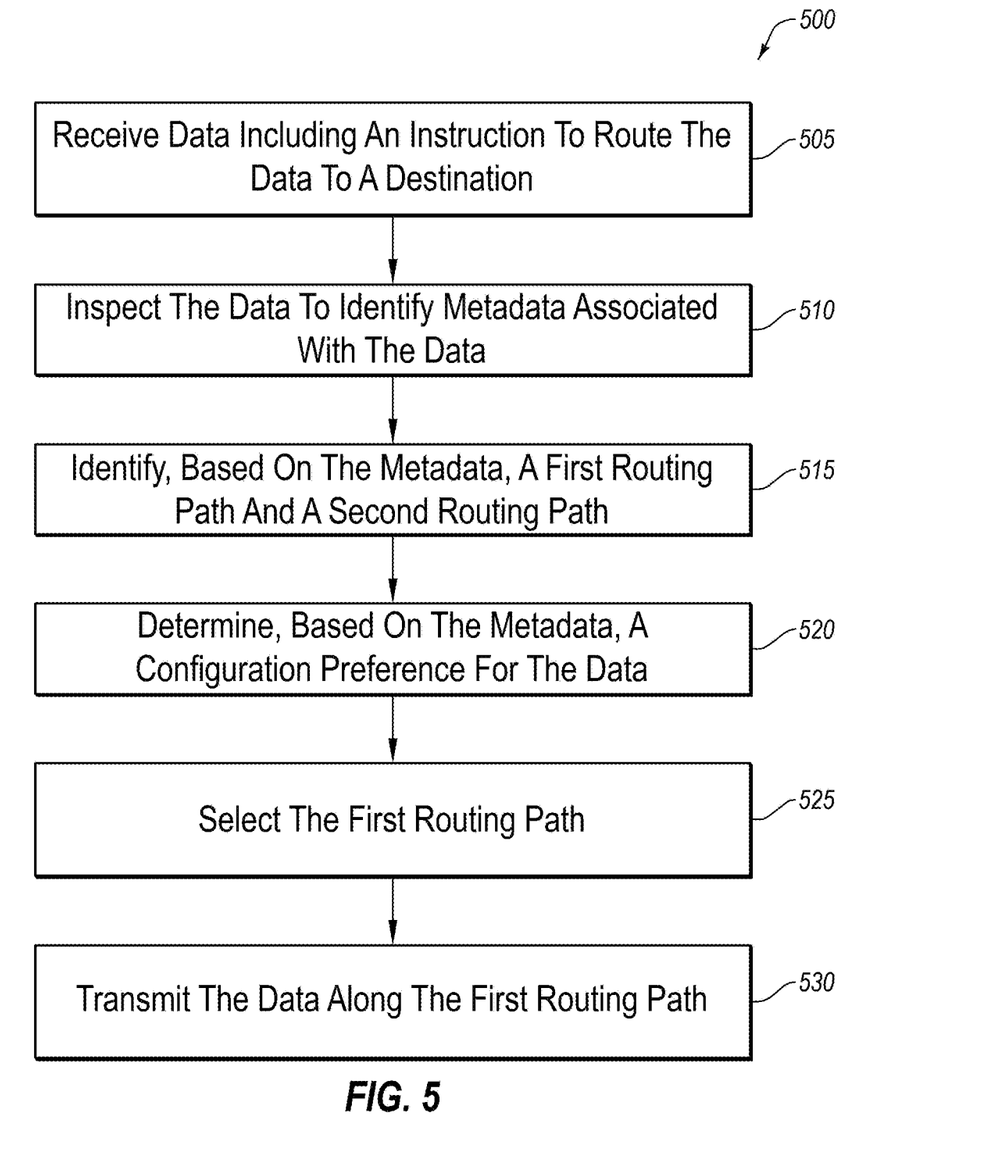
FIG. 5 illustrates a flowchart of an example method to route network traffic within a SDN.

FIG. 5 illustrates a flowchart of an example method 500 of routing network traffic within a SDN, in accordance with one or more embodiments of the present disclosure. The method may be performed by processing logic that may include hardware (circuitry, dedicated logic, etc.), software (such as is run on a general purpose computer system or a dedicated machine), or a combination of both, which processing logic may be included in the any of the network devices (e.g., the edge network devices 110, 210, 310, or 410 of FIGS. 1-4), or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 500 may begin at block 505, where the processing logic may receive data including an instruction to route the data to a destination. In at least one embodiment, the data includes at least one packet or a data flow.

At block 510, the processing logic may inspect the data to identify metadata associated with the data. In at least one embodiment, when inspecting the data to identify the metadata associated with the data, the processing logic may identify at least one of: a cost associated with a transmission of the data, a service level agreement (SLA) associated with the data, a source address, a source port, a destination address, a destination port, a protocol, a differentiated services code point (DSCP) value, a type of service (TOS) value, an application, a user, a user group. In at least one embodiment, when inspecting the data to identify the metadata associated with the data, the processing logic may inspect a header, the header including a DSCP value in the header to indicate a predefined routing path.

At block 515, the processing logic may identify, based on the metadata, a first routing path that leads to the destination and a second routing path that leads to the destination, the first routing path including a first communication link associated with a first link classification, and the second routing path including a second communication link associated with a second link classification. In at least one embodiment, the first communication link and the second communication link include one of: an Internet connection; a MPLS connection; a cellular connection, or a cable connection. In at least one embodiment, the first routing path and the second routing path include a same number of links, circuits, and tunnels for the data to reach the destination. In at least one embodiment, the first routing path and the second routing path include a same number of hops for the data to reach the destination.

At block 520, the processing logic may determine, based on the metadata, a configuration preference for the data to use routing paths associated with the first link classification. For example, the processing logic may look up the configuration preference in a policy stored in a data storage. The processing logic may look up the configuration preference using the metadata.

At block 525, the processing logic may select the first routing path based on the configuration preference and based on the first routing path including the first communication link associated with the first link classification. In at least one embodiment, the first link classification and the second link classification are the same. When selecting the first routing path, the processing logic may determine a first performance score for the first communication link and a second performance score for the second communication link. The first performance score for the first communication link may be indicative of a higher performance than the second performance score for the second communication link. In at least one embodiment, when determining the first performance score for the first communication link, the processing logic may determine the first performance score and the second performance score based on at least one of jitter, latency, and loss associated with the respective first communication link and second communication link. In at least one embodiment, when selecting the first routing path based on the configuration preference and based on the first routing path including the first communication link associated with the first link classification, the processing logic may identify an application associated with the data, determine whether the configuration preference includes a data routing rule for the application, and select the first routing path based on a determination that the configuration preference includes a data routing rule for the application to route along routing paths associated with the first link classification.

At block 530, the processing logic may transmit the data along the first routing path via the first communication link. In an example, the data may be routed along the first routing path from a local network device, through a remote network location, to a third party network resource. For example, a local computing device (such as the local computing device 450 of FIG. 4) may send requests or other network traffic through an edge network device (such as the edge network device 410a). In these and other embodiments, the edge network device may be configured to route data along the first routing path. For example, the first routing path may traverse an internal network domain to a data center, and then from the data center over the Internet to the third party network resource.

In at least one embodiment, when selecting the first routing path based on the configuration preference and based on the first routing path including the first communication link associated with the first link classification, the processing logic may rewrite the DSCP value in the header to indicate the first routing path. When transmitting the data along the first routing path via the first communication link, the processing logic may transmit the data along the first routing path via the first communication link based on the DSCP value in the header.

One skilled in the art will appreciate that, for these processes, operations, and methods, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

FIG. 6 illustrates an example computing system 600, according to at least one embodiment described in the present disclosure. The system 600 may include any suitable system, apparatus, or device configured to test software. The computing system 600 may include a processor 610, a memory 620, a data storage 630, and a communication unit 640, which all may be communicatively coupled. In some embodiments, any of the network devices (e.g., the edge network devices 110, 210, 310, or 410 of FIGS. 1-4), control devices (e.g., the control devices 120, 220, 320, or 420 of FIGS. 1-4), local computing devices (e.g., the local computing device 450 of FIG. 4) or other computing devices of the present disclosure may be implemented as the computing system 600. Additionally or alternatively, one or more of the network devices, control devices, local computing devices or other computing devices may be implemented as virtualized machines operating on a physical computing system such as the computing system 600.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of network or physical locations that are configured to perform individually or collectively any number of operations described in the present disclosure. In some embodiments, the processor 610 may interpret and/or execute program instructions and/or process data stored in the memory 620, the data storage 630, or the memory 620 and the data storage 630. In some embodiments, the processor 610 may fetch program instructions from the data storage 630 and load the program instructions into the memory 620.

After the program instructions are loaded into the memory 620, the processor 610 may execute the program instructions, such as instructions to perform the methods 500, 600, 700, 800, 900, and/or 1000 FIGS. 5-10, respectively. For example, the processor 610 may determine that a traffic flow is associated with a rerouting application and reroute the traffic flow along the path with the best performance score. As another example, the processor 610 may rewrite DNS queries and/or DNS replies. As an additional example, the processor 610 may route flows such that an NAT exit point associated with a rerouted path may be used. As an additional example, the processor 610 may determine which path from multiple paths is the best path and reroute traffic accordingly.

The memory 620 and the data storage 630 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610. In some embodiments, the computing system 600 may or may not include either of the memory 620 and the data storage 630.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 610 to perform a certain operation or group of operations.

The communication unit 640 may include any component, device, system, or combination thereof that is configured to transmit or receive information over a network, such as an MPLS connection, the Internet, a cellular network (e.g., an LTE network), etc. In some embodiments, the communication unit 640 may communicate with other devices at other locations, the same location, or even other components within the same system. For example, the communication unit 640 may include a modem, a network card (wireless or wired), an optical communication device, an infrared communication device, a wireless communication device (such as an antenna), a chipset (such as a Bluetooth device, an 802.6 device (e.g., Metropolitan Area Network (MAN)), a WiFi device, a WiMax device, cellular communication facilities, or others), and/or the like, or any combinations thereof. The communication unit 640 may permit data to be exchanged with a network and/or any other devices or systems described in the present disclosure. For example, the communication unit 640 may allow the system 600 to communicate with other systems, such as network devices, control devices, and/or other networks.

Modifications, additions, or omissions may be made to the system 600 without departing from the scope of the present disclosure. For example, the data storage 630 may be multiple different storage mediums located in multiple locations and accessed by the processor 610 through a network.

As indicated above, the embodiments described in the present disclosure may include the use of a special purpose or general purpose computer (e.g., the processor 610 of FIG. 6) including various computer hardware or software modules, as discussed in greater detail below. Further, as indicated above, embodiments described in the present disclosure may be implemented using computer-readable media (e.g., the memory 620 or data storage 630 of FIG. 6) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, or some other hardware) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method, comprising:
   receiving, from a control device, data including a routing instruction to route the data to a destination;
   inspecting the data to identify metadata associated with the data;
   identifying, based on the metadata, a first routing path that leads to the destination and a second routing path that leads to the destination, the first routing path being over a first type of communication network having a first level of security, the second routing path being over a second type of communication network having a second level of security, wherein each of the first type of communication network and the second type of communication network is a different one of an Internet connection, a MultiProtocol Label Switching (MPLS) connection, a cellular connection, or a cable connection;
   determining, based on the metadata, a configuration preference for the data to use routing paths corresponding to the first type of communication network and the second type of communication network;
   determining, from the routing instruction, a routing policy for the data to be routed through the first routing path;
   overriding the routing policy for the data to be routed through the first routing path by selecting the second routing path based on the configuration preference, traffic conditions on the first routing path and the second routing path, the first level of security and the second level of security; and
   transmitting the data along the second routing path.

2. The method of claim 1, wherein inspecting the data to identify the metadata associated with the data comprises identifying at least one of: a cost associated with a transmission of the data, a service level agreement (SLA) associated with the data, a source address, a source port, a destination address, a destination port, or a protocol.

3. The method of claim 1, wherein inspecting the data to identify the metadata associated with the data comprises identifying at least one of a differentiated services code point (DSCP) value, a type of service (TOS) value, an application, a user, or a user group.

4. The method of claim 1, wherein the first routing path and the second routing path include a same number of links, circuits, and tunnels for the data to reach the destination.

5. The method of claim 1, wherein the first routing path and the second routing path include a same number of hops for the data to reach the destination.

6. The method of claim 1, wherein the data includes at least one packet or a data flow.

7. The method of claim 1, wherein inspecting the data to identify the metadata associated with the data comprises inspecting a header, the header including a DSCP value in the header to indicate a predefined routing path.

8. The method of claim 7, further comprising:
   selecting the first routing path based on the configuration preference and based on the first type of communication network by rewriting the DSCP value in the header to indicate the first routing path, wherein transmitting the data along the first routing path via the first type of communication network comprises transmitting the data along the first routing path via the first type of communication network based on the DSCP value in the header.

9. The method of claim 1, further comprising:
   selecting the first routing path based on the configuration preference and based on the first type of communication network, wherein the selecting of the first routing path comprises:
   identifying an application associated with the data;
   determining whether the configuration preference includes a data routing rule for the application; and
   selecting the first routing path based on a determination that the configuration preference includes a data routing rule for the application to route along routing paths associated with the first type of communication network.

10. A non-transitory computer-readable medium that includes computer-readable instructions stored thereon that when executed by a processor, cause the processor to:
receive, from a control device, data including a routing instruction to route the data to a destination;
inspect the data to identify metadata associated with the data;
identify, based on the metadata, a first routing path that leads to the destination and a second routing path that leads to the destination, the first routing path being over a first type of communication network having a first level of security, the second routing path being over a second type of communication network having a second level of security, wherein each of the first type of communication network and the second type of communication network is a different one of an Internet connection, a MultiProtocol Label Switching (MPLS) connection, a cellular connection, or a cable connection;
determine, based on the metadata, a configuration preference for the data to use routing paths corresponding to the first type of communication network and the second type of communication network;
determine, from the routing instruction, a routing policy for the data to be routed through the first routing path;
override the routing policy for the data to be routed through the first routing path by selecting the second routing path based on the configuration preference, traffic conditions on the first routing path and the second routing path, the first level of security and the second level of security; and
transmit the data along the second routing path.

11. The non-transitory computer-readable medium of claim 10, wherein the metadata associated with the data includes at least one of: a cost associated with a transmission of the data, a service level agreement (SLA) associated with the data, a source address, a source port, a destination address, a destination port, a protocol, a differentiated services code point (DSCP) value, a type of service (TOS) value, an application, a user, a user group.

12. The non-transitory computer-readable medium of claim 10, wherein inspecting the data to identify the metadata associated with the data comprises inspecting a header, the header including a DSCP value in the header to indicate a predefined routing path.

13. A system comprising:
a memory configured to store instructions for processor operations; and
one or more processors, the one or more processors configured to:
receive, from a control device, data including a routing instruction to route the data to a destination;
inspect the data to identify metadata associated with the data;
identify, based on the metadata, a first routing path that leads to the destination and a second routing path that leads to the destination, the first routing path being over a first type of communication network having a first level of security, the second routing path being over a second type of communication network having a second level of security, wherein each of the first type of communication network and the second type of communication network is a different one of an Internet connection, a MultiProtocol Label Switching (MPLS) connection, a cellular connection, or a cable connection;
determine, based on the metadata, a configuration preference for the data to use routing paths corresponding to the first type of communication network and the second type of communication network;
determine, from the routing instruction, a routing policy for the data to be routed through the first routing path;
override the routing policy for the data to be routed through the first routing path by selecting the second routing path based on the configuration preference, traffic conditions on the first routing path and the second routing path, the first level of security and the second level of security; and
transmit the data along the second routing path.

14. The system of claim 13, wherein when inspecting the data to identify the metadata associated with the data, the one or more processors are configured to inspect a header, the header including a DSCP value in the header to indicate a predefined routing path.

15. The non-transitory computer-readable medium of claim 12, wherein the instructions, when executed by the processor, cause the processor to:
select the first routing path based on the configuration preference and based on the first type of communication network by rewriting the DSCP value in the header to indicate the first routing path, wherein transmitting the data along the first routing path via the first type of communication network comprises transmitting the data along the first routing path via the first type of communication network based on the DSCP value in the header.

16. The system of claim 14, wherein the one or more processors configured to:
select the first routing path based on the configuration preference and based on the first type of communication network by rewriting the DSCP value in the header to indicate the first routing path, wherein transmitting the data along the first routing path via the first type of communication network comprises transmitting the data along the first routing path via the first type of communication network based on the DSCP value in the header.

* * * * *